V. A. ROUILLIARD.
ARMORED TIRE.
APPLICATION FILED DEC. 16, 1911.

1,022,333.

Patented Apr. 2, 1912.

WITNESSES
Samuel E. Wade
Amos W. Hart

INVENTOR
Victor A. Rouilliard
BY Munn & Co.
ATTORNEYS

UNITED STATES PATENT OFFICE.

VICTOR A. ROUILLIARD, OF FALL RIVER, MASSACHUSETTS, ASSIGNOR OF ONE-HALF TO ARMEL L. AUDET, OF FALL RIVER, MASSACHUSETTS.

ARMORED TIRE.

1,022,333.      Specification of Letters Patent.      Patented Apr. 2, 1912.

Application filed December 16, 1911. Serial No. 666,178.

*To all whom it may concern:*

Be it known that I, VICTOR A. ROUILLIARD, a citizen of the United States, and a resident of Fall River, in the county of Bristol and State of Massachusetts, have invented an Improved Armored Tire, of which the following is a specification.

The object of my invention is to provide an improved armor or protector for rubber, especially pneumatic, tires of automobiles, motorcycles, and other motor-propelled vehicles, whereby they will be made practically puncture-proof and without materially increasing their thickness and weight and with but little addition to their cost. To this end, I apply a metallic coat to the outer surface of the superposed layers of the tire, the operation being effected by electro-deposition in the process of manufacture of the tire.

The details of the invention are hereinafter described with reference to the accompanying drawing, in which—

Figure 1:
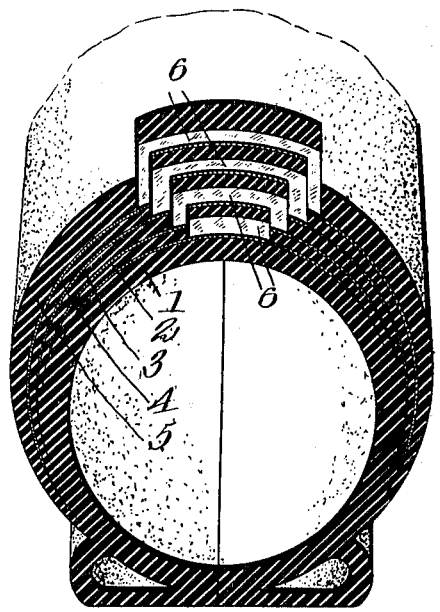
Figure 2:
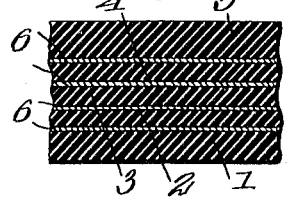

Figure 1 is a sectional perspective view of a portion of a pneumatic tire constructed in accordance with my invention. Fig. 2 is a longitudinal section of a portion of the tire.

The tire illustrated in the drawing is formed of an inner cylindrical rubber portion 1 having a suitable base by which it is secured to the rim of a wheel. Upon the outer side of the part 1 is a series of superposed rubber layers indicated, respectively, by numerals 2, 3, 4, 5.

The inner cylinder or body portion 1 may be molded from rubber or from a rubber composition in the usual way and the superposed layers are severally molded, and then applied to the part 1 in superposed relation as shown.

Upon the outer side of the body or cylinder 1, I form a metallic coat 6 by electro-deposition of any suitable metal, such as copper, iron, silver, steel, or aluminum, and I apply a coat in the same manner to the surface or outer side of each of the several layers 2, 3, 4. The coat being quite thin has great elasticity and will conform to the undulations of the several parts on which it is applied, which may be due to sudden or prolonged compression either locally or generally on the outer side of the tire. Thus, while adding but little to the weight and cost of the tire as a whole, it renders it practically invulnerable to puncture, thus adding very greatly to the durability of the tire.

What I claim is:—

1. A rubber tire comprising one or more layers and a protecting metallic coat electro-deposited on one of them, substantially as described.

2. A pneumatic rubber tire composed as to its exterior, peripheral portion of a series of superposed layers each having a protecting metallic coat formed by electro-deposition, substantially as described.

VICTOR A. ROUILLIARD.

Witnesses:
FRANK MULVENY,
WILLIAM A. MCCAULEY.